Aug. 1, 1933.                    A. MEYER                     1,920,760
                        EDDY CURRENT CAR RETARDER
                   Filed Nov. 11, 1930         2 Sheets-Sheet 1
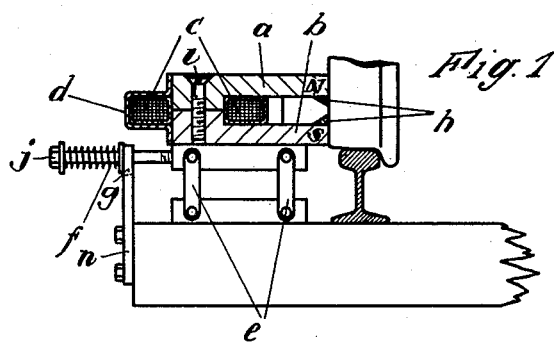
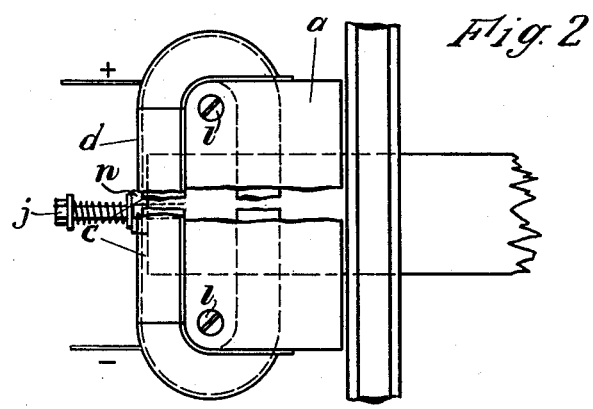
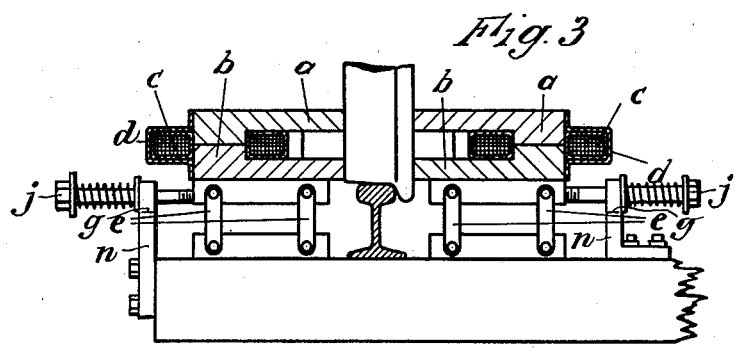
INVENTOR
AUGUST MEYER
BY
ATTORNEYS.

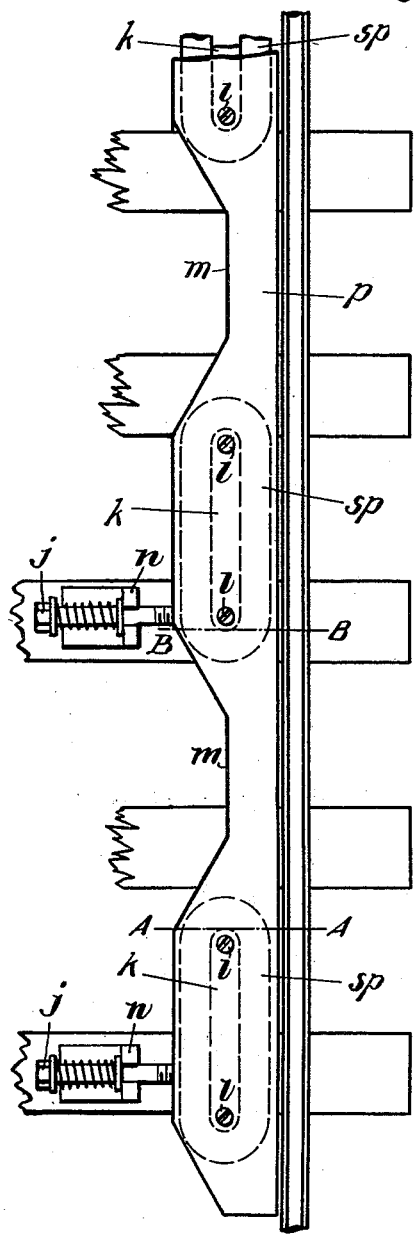
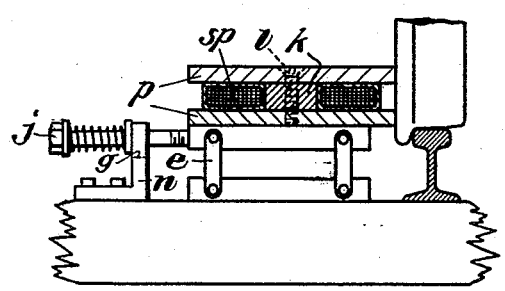
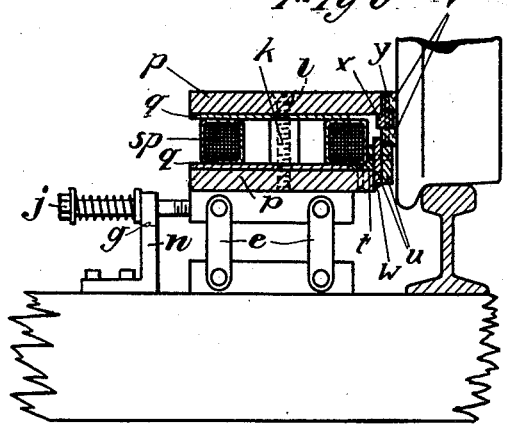

UNITED STATES PATENT OFFICE 1,920,760

EDDY CURRENT CAR RETARDER

August Meyer, Berlin-Schoneberg, Germany, assignor to Gesellschaft fur Oberbauforschung und Rangiertechnik m. b. H., Berlin, Germany Application November 11, 1930, Serial No. 494,914, and in Germany November 26, 1929

12 Claims. (Cl. 188—62)

My invention relates to an eddy current car retarder. In the eddy current car retarders hitherto known there is provided on each side of the wheel to be braked a brake rail, the one on the one side being the north pole and the other on the other side the south pole of a magnetic circuit. The magnetic circuit is closed beneath the rails across yokes with magnet cores which carry the exciting windings. This type of eddy current car retarders presents certain technical difficulties, since the magnetic flux passing beneath the track rails requires relatively long yokes having large iron cross-sections. Attempts have also been made to have the poles of opposite polarity follow in the longitudinal direction, but with this arrangement the desired effects could not be obtained and are not also to be expected.

The object of the present invention is to provide for an eddy current car retarder in which the north and south poles are arranged one upon another in a single brake rail so as not to necessitate any other flux carrying parts than the brake rail. To obtain this arrangement, the brake rail is provided with longitudinal slots on the side which faces the wheel, and these slots are used for accommodating the exciting winding. The new brake therefore consists so to say only of the brake rails which are supported on ties so as to be movable.

The accompanying drawings illustrate some examples in which:

Fig. 1 shows an example of a brake rail in cross-section on one side of the wheel to be braked.

Fig. 2 shows a plan of the same, with certain of the parts omitted for clearness.

Fig. 3 shows a corresponding type in cross-section having a brake rail on each side.

Fig. 4 shows a plan of another arrangement of a brake rail with various magnet cores and exciting coils.

Fig. 5 illustrates a cross-section of the same.

Fig. 6 illustrates a cut through a brake rail corresponding to Fig. 4 in a somewhat modified form and on a magnified scale.

According to Fig. 1 the brake rail consists of two parts $a$ and $b$, between which the exciting coil $c$ is arranged. The exciting coil $c$ is completely protected by both parts $a$ and $b$ on the side which faces the wheel (inner side), and on the other side by a hood $d$.

When the exciting coil $c$ is traversed by a current two magnet poles N and S are created in the brake rail. The flux path between the poles at their inner ends is closed through the wheel which is to be braked. Through the movement of the wheel along the brake rail eddy currents are produced in the wheel, which bring about a brake effect. This brake effect is increased by the friction between the brake rail and the wheel caused by the force with which the brake rail is urged against the wheel due to the magnetic attraction of the brake rail for the wheel. The brake rail is supported on the ties by means of links $e$, which permit the brake rail to be moved perpendicularly to the track rail. The brake rail is drawn back from the wheel in the unexcited state by springs F, only one of which is visible in Fig. 1 because the other springs are directly back of the one shown. Each spring $f$ is arranged on a draw member $j$ having a head at one end and fastened at the other end to the brake rail. Each draw member passes intermediate its ends through an elongated vertical slot $g$ in an upright $n$ which is secured to one of the ties which support the brake rail, the associated spring $f$ being interposed on the draw member between the upright and the head of the draw member. With this construction it will be seen that when the exciting winding $c$ is deenergized, the springs $f$ will move the brake rail away from the track rail until the draw members engage the bottoms of the slots $g$ in the associated uprights, the parts being so proportioned that the draw members will engage the bottoms of the slots when the brake rail is far enough away from the track rail to clear the wheels of any kind of a vehicle which may traverse the track rail.

Fig. 2 shows a plan of this brake, which, as above described, can be readily understood.

In order to increase the cross-sectional area of the lines of force passing through to the wheel and to reduce the flux leakage to a minimum it is advisable to enlarge the wheel engaging ends of the poles by means of the pole-pieces $h$. In this case it is then necessary, in order to place the energizing coil inside, to make the brake rail of two parts which are bolted together by means of bolts $l$.

This brake may also be carried out according to Fig. 3 as a double brake rail for one wheel.

Owing to the length of the coils, the construction of the brake as shown in Figs. 1, 2 and 3 is expensive and requires a considerable amount of copper, as the conductors must run over the entire length of the brake rail on the front side and then on the back side. The length of a single winding is therefore somewhat longer than the double length of the brake rail. According to the invention a considerable saving in copper and consequently in first cost and in cost of current can be effected by constructing the brake rail in the manner illustrated in Figs. 4 and 5. As here shown, the brake rail consists of two vertically spaced horizontally arranged pole plates $p$ between which are placed a plurality of spaced longitudinally arranged magnet cores $k$, each of which is surrounded by a magnet winding $sp$ to form an electromagnet, the pole plate and cores being secured together by suitable bolts $l$.

The brake rail is arranged to be moved toward or away from the track rail by means of a spring $f$ and a draw member $j$ which are each similar to the spring $f$ and draw member $j$ described in connection with Fig. 1. The magnet cores are made wider or narrower depending upon the length of the space between them and the length of the cores themselves in order to obtain a cross-section of the core which is large enough to carry, without becoming saturated, the necessary flux lines for exciting the total field in the desired manner.

Any lines of force which are set up in the pole space between the cores flow towards the latter through the pole plates from the exciting coils, placed at both sides.

The magnet cores $k$ with the exciting coils $sp$ are spaced apart a distance which is determined by the conditions of the magnetic saturation. The maximum permissible length of the pole space between adjacent cores is limited to such a length that the desired useful field and leakage field, existing in this space can be each half supplied by the flux passing through the cross-section A—A and B—B.

The pole space can therefore be increased the larger the iron cross-sections are at A—A and B—B and the smaller the total leakage field of the pole space is. The cross-section of the pole plates $p$, $p$ may be enlarged by rendering them broader, obtaining thereby the further advantage that the winding is then also covered by the pole plates at the side which faces the wheel.

When the pole space is increased the magnitude of the leakage field increases also, which is extremely strong, particularly between the pole plates owing to their small distance from one another. The total height of the brake rail from the top of the track rail should not exceed at present in Germany 120 mm., so that at the utmost 40–50 mm. are left for the space between the both pole plates; for other countries similar regulations are in force. Further it is not possible for technical reasons to enlarge at will the pole plates $p$. To reduce the leakage field between the pole plates which forms the greatest part of the total leakage field, it is therefore advisable to increase the spacing between the pole plates and to decrease the width of the pole plates.

By retaining the thickness of the pole plates and increasing the spacing between them, the thickness of the total brake rail will be made greater. The highest possible position of the top of the brake rail with regard to the loading gauge is fixed, as above mentioned by the regulations of the railway administrations. One shall take from the beginning into account the above fixed limit for the top of the brake rail in order that the pole plate comes in contact with the greatest possible chord of the wheel to be braked, that is, with the greatest possible length, and in order that they affect the largest possible wheel surface. Should the vertical dimension of the brake rail (thickness) be increased, the lower pole plate would lie under certain circumstances so much lower that the contact chord on the wheel will be shortened to an inadmissible dimension. The flux density at the point where the flux passes over from the pole plate into the wheel or vice versa will then be too high. This drawback can be eliminated by bending upwards the front part of the lower pole plate or by bringing about a corresponding flux distribution by means of special pole pieces $v$, $v$. The horizontal surface of symmetry of the pole pieces is then displaced upwards in relation to the cores and pole plates.

The pole pieces $v$, $v$, are arranged so as to be removable and are connected to one another by means of a non magnetic intermediate layer $x$ in order that they may easily be interchanged when worn after a long period of use.

The corresponding example Fig. 6 shows the core $k$ and the magnet coil $sp$ between the pole plates $p$, $p$. To the lower front edge of the pole plate $p$, a shoulder is fastened by means of rivets, consisting of an angle iron $t$ and two flat irons $u$. To improve the fastening and the flux a weld fillet $w$ may be provided. $v$, $v$ are the pole pieces and $x$ the intermediate layer, made of non magnetic material. The said three parts are held together by rivets. They rest with their lower edge on the front flat iron and are fastened at the top by bolts, which pass either through the upper pole piece $v$ and have their thread in the pole plate $p$ or the fastening may also be carried out in such a manner that the angle irons rest on the lower side of the pole plate $p$ and that the bolts, passing through the angle irons, hold the non magnetic intermediate layer $x$. An insulating plate $q$ is provided between each pole plate and the winding $sp$ to increase the spacing between the pole plates.

The brake rail when constructed as shown in Fig. 6 is arranged to be moved away from the track rail when the winding $sp$ is deenergized, by means of apparatus which is similar to that shown in the preceding views.

A further reduction of the leakage flux in the pole space between each two adjacent magnets may be obtained by cutting out the pole laminations, as shown at $m$ in Fig. 4, the magnetic load of which, apart from the relatively small useful flux, decreases towards the middle of the pole space proportionally to zero. In this way it is possible to reduce the weight of copper as compared to the originally conceived form by more than half, so that a simple and economic design of brake results.

Which pole length and which pole-pitch give the most favorable conditions, depends upon the form and the magnitude of the leakage and useful field as well as upon the magnetic reaction, caused by the eddy currents in the wheel and brake rail. The above said conditions will therefore be different depending upon the wheel thickness and the corresponding speed. Their determination by calculation seems hardly possible, only experiments can bring about some results.

I claim as my invention:

1. An eddy current car retarder comprising a brake rail containing pole plates, various magnet cores arranged one after another along the brake rail between the pole plates, each magnet core being provided with an exciting winding.

2. Eddy current car retarder as claimed in claim 1, said pole plates being of such width that they completely cover the exciting windings.

3. An eddy current car retarder comprising a brake rail containing pole plates, various pole cores arranged one after another along the brake rail between the pole plates, each magnet core being provided with an exciting winding, said pole plates covering the exciting windings and being tapered toward the middle between two magnet cores.

4. An eddy current car retarder comprising a brake rail with lateral longitudinal slot, an exciting winding, pole pieces arranged in front of the poles, formed by the slot.

5. An eddy current car retarder, containing a brake rail with poles placed one above another, three pole piece strips, one strip being made of non magnetic material, said three strips being connected to one another by fastening means and jointly placed in front of said poles with the non magnetic strip disposed between the other two.

6. An eddy current car retarder containing magnet cores, exciting windings arranged on said magnet cores, pole plates in contact with said magnet cores, forming at the track rail side poles arranged one above another and having such a form that the centre line of the pole surfaces lies higher than the surface of symmetry of the magnet cores and exciting windings.

7. An eddy current car retarder, containing magnet cores, exciting windings arranged on said magnet cores, pole plates at both sides of the magnet cores, pole pieces placed at the track rail side of the pole plates, the upper pole plate extending as far as the upper pole piece, the lower pole plate ending in front of the lower pole piece and in the space between both an unsymmetrical intermediate piece being arranged.

8. An eddy current car retarder as claimed in claim 7, said intermediate piece having a horizontal and vertical contact surface for the lower pole plate and a horizontal and vertical contact surface for the lower pole piece.

9. An eddy current car retarder comprising magnet cores, exciting windings arranged on said magnet cores, pole plates at both sides of the magnet cores, pole pieces placed at the track rail side of the pole plates, the upper pole plate extending as far as the upper pole piece, the lower pole plate ending in front of the lower pole piece and in the space between both an unsymmetrical intermediate piece being arranged, said intermediate piece consisting of flat and angle iron.

10. A railway car retarder comprising a U-shaped electromagnet mounted with its poles horizontally disposed one above the other and movable toward and away from a position wherein its pole faces coact with the side of a car wheel.

11. A railway car retarder comprising a U-shaped electromagnet the poles of which are in the form of extended horizontal plates disposed one above the other, and means for mounting said magnet so that it is movable toward and away from a position wherein its pole faces coact with the side of a car wheel.

12. A railway car retarder comprising an electromagnet the poles of which are in the form of horizontal members disposed one above the other, and means for mounting said magnet so that it is movable toward and away from a position wherein its pole faces coact with the side of a car wheel.

AUGUST MEYER.